United States Patent [19]

Setterstrom

[11] 3,892,690
[45] July 1, 1975

[54] METHOD OF PREPARING POLYETHYLENE FOAM

[75] Inventor: Carl A. Setterstrom, Ho-Ho-Kus, N.J.

[73] Assignee: Cities Service Company, Tulsa, Okla.

[22] Filed: June 23, 1972

[21] Appl. No.: 265,865

Related U.S. Application Data

[63] Continuation of Ser. No. 66,719, Aug. 25, 1970, abandoned.

[52] U.S. Cl..... 260/2.5 HA; 260/2.5 E; 260/94.9 F; 264/53
[51] Int. Cl........................... C08f 47/10; C08f 3/04
[58] Field of Search........ 260/2.5 E, 2.5 HA, 94.9 F

[56] References Cited
UNITED STATES PATENTS 2,957,859  10/1960  Mertes .......................... 260/215 HA
3,336,281  8/1967  Eilbracht et al................ 260/94.9 F
3,668,161  6/1972  Nauman et al................ 260/2.5 HA Primary Examiner—Wilbert J. Briggs, Sr.
Attorney, Agent, or Firm—Elton F. Gunn

[57] ABSTRACT

A method of manufacturing a foamed polyethylene material is disclosed herein, wherein the polyethylene-ethylene product stream from a high pressure polymerization reactor is introduced to an extruder after an intermediate pressure reduction and preferably extruded through a die at a pressure differential of from about 150 to 1,200 psi and preferably 200 to 750 psi. The polyethylene stream to the extruder comprises about 0.1% to 5% wt. ethylene, which acts as a foaming agent during the extrusion.

7 Claims, 1 Drawing Figure

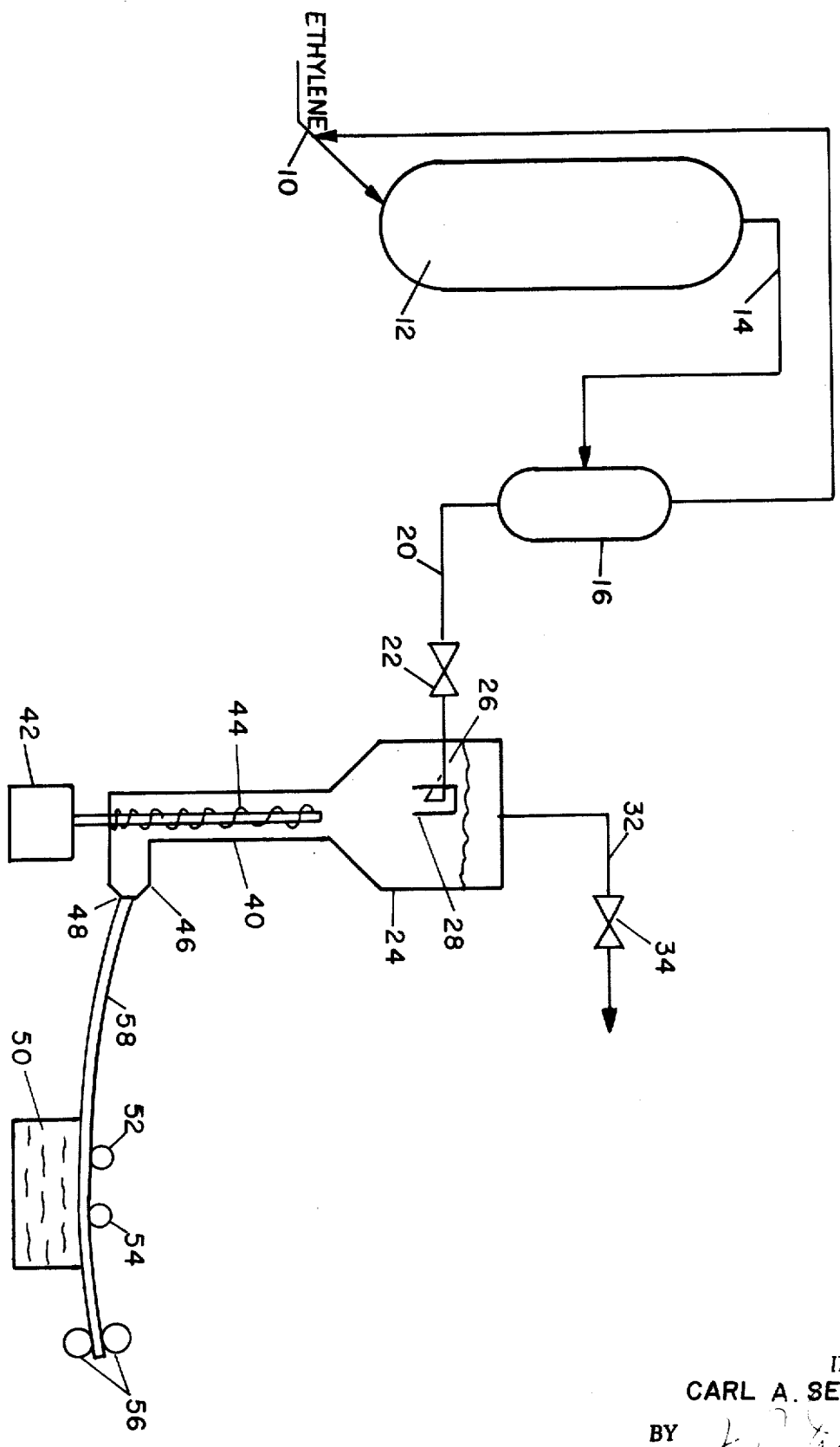

3,892,690

METHOD OF PREPARING POLYETHYLENE FOAM

BACKGROUND OF THE INVENTION

This is a continuation of application Ser. No. 66,719 filed Aug. 25,1970, and now abandoned.

This application relates to a process for producing foam polyethylene, more particularly to a process wherein the foam polyethylene is produced directly from the reaction product stream of a high pressure ethylene polymerization reactor. Foam polyethylene is a rather useful material and can be employed in any number of applications such as for furniture, decorative articles, sheet material, caulking and the like. It is known that ethylene can be converted into solid and semi-solid polymers of high molecular weight by subjecting these hydrocarbons to a polymerization reaction at from 700 to 50,000 psi and at temperatures between 100°F and 750°F. An initiator such as oxygen or per-oxygen type compound is generally introduced into the reactor to begin the polymerization. Generally, the polymerization reaction is conducted in either an autoclave type or a tubular reactor zone. In either case, the mixture of polymer and monomer that is a solution of polyethylene and ethylene is recovered through a high pressure let-down valve which reduces the pressure and permits separation of the polymer from the reaction mixture in a series of separation steps. These steps consist of reducing the pressure to about 2,000 psi to 5,000 psi in a separator so that a major proportion of the ethylene vaporizes and is recycled to the reactor. The stream may be reduced in pressure through another let-down valve to another separator where any remaining entrained ethylene is vaporized from the vessel through another recycle line. The polymer is then fed to an extruder and recovered as a ribbon or in the form of pellets.

The fact that the polyethylene can be produced as a foam material is well-known and a number of patents illustrate particular methods and apparatus for producing it. Illustrative patents for foamed polyethylene are U.S. Pat. No. 2,387,730 issued to W. L. Alderson Jr. on Oct. 30, 1945, U.S. Pat. No. 3,178,377 issued Apr. 13, 1965 to R. A. V. Raff and U.S. Pat. No. 3,485,774 issued Dec. 23, 1969 to W. L. McKenica. In all the aforesaid patents, a foaming agent is incorporated with a polyethylene resin so that at elevated temperatures a gas evolves during the molding step which expands and foams in the solidifying resin trapping millions of cells in the plastic material. For instance U.S. Pat. No. 2,387,730 to Alderson Jr. discloses that any number of inert gases soluble in molten polyethylene may be employed as a foaming agent. More specifically in Example 1, of Alderson Jr.'s disclosure, a powdered ethylene polymer is melted in a high pressure container (i.e. 545 psi at 133°C) having an ethylene atmosphere. Subsequently the pressure and temperature in the container is reduced to about 240 pounds psi at the above described temperature then to 150 psi at room temperature in order to solidify the melt. Finally the pressure is slowly bled to atmospheric to obtain the foamed product. The ethylene polymer product was found to have a density of about 0.33 as opposed to an unfoamed polymer density of about 0.94 and to contain numerous discreet uniformed cells measuring about 0.005 inches in diameter. It is clearly seen that use of such a resin in a commercial application is difficult. Alderson Jr. also discloses that an unsatisfactory product was obtained if the ethylene pressure is rapidly reduced to atmospheric, the product being found to have larger interconnecting pores which were non-uniform.

SUMMARY OF THE INVENTION

It is therefore an object of this invention to provide a process which achieves a satisfactory closed cell foamed polyethylene material more efficiently than the process shown by Alderson Jr.

An object of this invention is therefore to provide a process for utilizing the product stream from a high pressure ethylene polymerization process to produce a foam polyethylene product.

Another object of this invention is to provide a process for producing a superior foam polyethylene material efficiently.

I have invented a method for manufacturing foam polyethylene material utilizing ethylene as the foaming agent which comprises withdrawing a liquid polyethylene and ethylene stream from a high pressure, high temperature ethylene polymerizing zone, reducing the pressure of said withdrawn polyethylene-ethylene liquid solution to a pressure in the range of 150 psi to 1200 psi, and expelling said reduced pressure polyethylene-ethylene into a zone of atmospheric pressure whereby said ethylene vaporizes during said explusion forming the foamed polyethylene material having a multiplicity of closed cells. The reduced pressure polyethylene-ethylene liquid phase solution is maintained at elevated temperature and pressure prior to extrusion in order to retain the solution in a liquid phase, and comprises between about 0.1 and 5 % by weight ethylene and preferably between 1 and 4% wt. ethylene.

Other objects and advantages of the process of the present invention will become apparent from the Description of the Drawings and Preferred Embodiments which follow.

BRIEF DESCRIPTION OF THE DRAWINGS

The drawings shows in schematic form, apparatus for performing the method according to this invention.

BRIEF DESCRIPTION OF THE PREFERRED EMBODIMENT

Low density polyethylene resins are commercially produced from an ethylene feedstock as discussed above in a polymerization reactor at extremely high pressures, e.g., in the neighborhood of from 7500 psi to 50,000 psi and at temperature of up to 750°F. with reference to both the feed and the polyethylene resin it should be understood that it is intended to cover those ethylene polymer resins produced by high pressure polymerization of ethylene and various compatible polymerizable monomers, the latter being in amounts of up to 50% by weight though preferably in the amount of less than 10%. For instance, various monomers such as vinyl acetate, propylene, and isobutylene are generally included with ethylene in the feedstock and result in a ethylene polymer i.e., commercial grade low denisty polyethylene containing one or more of these copolymers, the propylene and isobutylene generally being employed as chain terminators while the vinyl acetate may be included in greater amounts as a copolymer. These polyethylene resins are solids at room temperature and are well known commonly used resins in plastics manufacture, and generally have a melt index of from about 0.1 to about 30 and a density from about 0.90 to 0.94.

The product stream from the ethylene polymerization reactor contains generally between about 10 to 30-per fetterstrom polyethylene resin, the remainder being ethylene, and with the polyethylene and ethylene being essentially in solution with each other. From the reactor which may be either of the aforementioned autoclave type or tube type, the product stream is passed to a reduced pressure separator being maintained in the neighborhood of from about 2000 psi to 5000 psi. The separator as conventionally employed separates a major proportion of the ethylene from the polyethylene and returns the ethylene to the reactor as recycled monomer feed.

My invention is directed to withdrawing the ethylene-polyethylene liquid stream after separation; subjecting the stream with appropriate venting of ethylene to reduce the pressure of the stream and the amount of ethylene in solution to about 5% wt.; and passing the reduced pressure stream to an extruder, or other similar plastic molding machine having an orifice across which a pressure drop of from 150 psi to about 1200 psi occurs. More particularly the process involves withdrawing the stream of polyethylene and ethylene from the reactor at reactor pressure and temperature and reducing the pressure to about 2000 to 5000 psi to vaporize a major proportion of the ethylene. The ethylene vapor is separated from the liquid polyethylene-ethylene solution and recycled to the polymerization reactor, and as such constitutes conventional prior art practice in producing polyethylene. The reduced pressure polyethylene-ethylene stream contains significant amounts of ethylene, that is up to 30% weight ethylene in solution with the polyethylene. The reduced pressure liquid polyethylene-ethylene stream is further reduced in pressure to no more than 1200 psi and preferably to between 200 psi and 750 psi, preferably by venting ethylene vapor therefrom and the low pressure polyethylene-ethylene liquid stream is expelled through an orifice into a zone maintained at substantially ambient pressure. The low pressure liquid polyethylene-ethylene stream contains between about 1 and 5% wt. ethylene in solution which upon passing through the orifice to the ambient pressure zone vaporizes and induces a foaming action in the polyethylene which is simultaneously passing through the orifice and solidifying. The product is a foamed polyethylene material with a multiplicity of minute closed cell pores and with a preferred density of less than 10 lbs. per cubic foot. The temperature of the low pressure liquid polyethylene-ethylene stream is any temperature at which the polyethylene resin and ethylene stays in the liquid phase, but preferably between 300°F and 500°F at its explusion through the orifice. The temperature of the zone into which the polyethylene-ethylene liquid is expelled should be below the temperature at which the polyethylene resin solidifies and preferably 10°F below the solidifying temperature. Employing ambient temperatures obtains satisfactory results.

Referring now to the drawing in which a schematic representation of apparatus for performing the process of this invention is shown, ethylene is introduced into a reactor 12 operated at high pressures of from 15,000 to 20,000 psi and at elevated temperatures. The resulting reaction product is a high pressure liquid stream comprising between about 10 and 30% wt. polyethylene in solution with ethylene. The reactor effluent stream which is liquid is withdrawn from the reactor through conduit 14. The extremely high pressure polyethylene-ethylene effleunt stream is passed from the reactor vessel 12 via the conduit 14 to a separator 16 operated at a pressure in the neighborhood of 3,000 psi. The stream at a lower pressure of preferably 3,000 psi is withdrawn from the separator via a drawoff conduit 20 in which s throttling valve 22 is mounted. The drawoff conduit 20 is connected to a sealed and vented feed hopper 24 and through an outlet 26 located in a downwardly open feed cap 28 introduces the lower pressure liquid into the feed hopper 24. Approximately 75 to 90% wt of the ethylene is vented via a venting conduit 32 attached to the top of the feed hopper. The venting is controlled by a valve 34 mounted in the venting conduit which enables the operator to maintain a specified proportion of ethylene in the feed hopper.

The feed hopper is directly connected to a vertically mounted screw extruder 40. A variable speed drive 42 is connected to the bottom of the extruder for driving a screw 44 mounted within the extruder. A die 46 is mounted directly adjacent the bottom of the screw so that the melt stream comprising polyethylene and including from about 0.1 to 5% wt. ethylene is forced through a orifice 48 in the die 46. In the form illustrated the die orifice 48 opens to ambient conditions and adjacent a cooling tank 50 having two rollers 52 and 54, mounted atop the tank 56. The tank contains a cooling medium such as water. The shape extruded from the die through the slit passes under the two rollers, through the tank and to a pair of drawoff rolls 56 one being rotatably mounted above the other, for drawing the cooled polyethylene foam material.

With a view to more fully describing the process of my invention, the following example is given by way of illustrattion and not limitation.

EXAMPLE

Polyethylene having a melt index of 3.0 and a density of 0.918 was withdrawn as part of the liquid stream from the separator at 3000 psi and introduced into the extruder hopper, at a temperature of about 410°F to 420°F and a pressure of about 440 psig with variations as to extruder melt pressure. The die shape was a rod extruded through a die opening into ambient conditions and measuring 0.625 inches in diameter. The following results were obtained with the specified variations in extruder melt pressure, screw speed and extrusion rate.

|  | Run 1 | Run 2 | Run 3 | Run 4 | Run 5 | Run 6 |
| --- | --- | --- | --- | --- | --- | --- |
| Hopper Zone Temp. °F | 412 | 413 | 414 | 420 | 420 | 420 |
| Die Zone Temp. °F | 258 | 270 | 264 | 240 | 245 | 230 |
| Hopper Pressure of (psig) | 440 | 440 | 440 | 580 | 640 | 640 |
| Extruder Melt Pressure (psig) | 550 | 470 | 475 | 420 | 420 | 420 |
| Scew Speed (rpm) | 43 | 60 | 78.5 | 60 | 60 | 60 |

Table — Continued

|  | Run 1 | Run 2 | Run 3 | Run 4 | Run 5 | Run 6 |
|---|---|---|---|---|---|---|
| Extrusion Rate (lb/m) | 17.8 | 24.1 | 27.3 | 17.1 | 20.8 | 19.9 |
| Foam Density (lg/ft.³) | 7.2 | 6.71 | 5.91 | 7.2 | 7.8 | 8.1 |
| Cell Size (milimeter) | .5–2.5 | 1–2.5 | 1–2 | 1.5–4 | 1.5–3 | 2–3 |

It can thus be seen that a product having a density of up to from about 5.9 to 8.1 lb/ft.³ is produced. Best results were obtained at the higher screw speeds and extrusion rate characterized by run 3.

Having fully described our invention and wishing to cover those variations and modifications which will be apparent to those skilled in the art without departing from the scope or spirit of the invention,

I claim:

1. A method for manufacturing a polyethylene foam which comprises:
   a. withdrawing a solution of polyethylene in ethylene monomer from a heated, high pressure polyethylene polymerization zone wherein the ethylene monomer is the polymerization medium,
   b. reducing the pressure of said solution to within the range of about 150 psi to about 1200 psi, vaporizing and separating some of the ethylene monomer from the solution while maintaining the solution temperature above the melting point of the polyethylene and reducing the ethylene content of the solution to a level of about 0.1 to about 5 weight percent,
   c. extruding the heated, devaporized solution from step (b) into a recovery zone at atmospheric pressure and at a temperature at which the ethylene of the solution vaporizes and the polyethylene simultaneously solidifies, the polyethylene being simultaneously blown and solidified upon extrusion, and
   d. recovering from step (c) a closed-cell, solidified polyethylene foam product having a density of less than 10 lbs. per cubic foot.

2. The method of claim 1 wherein the polyethylene has a melt index within the range of about 0.1 to about 30.

3. The method of claim 1 wherein the devaporized solution of polyethylene and ethylene is at a temperature of from about 300°F. to about 500°F. just prior to extrusion of the solution.

4. The method of claim 3 wherein the devaporized solution is at a pressure of from about 200 to about 750 psi just prior to extrusion of the solution.

5. The method of claim 1 wherein the heated, high pressure polymerization zone is at a pressure of from about 7500 psi to about 50,000 psi.

6. The method of claim 5 which additionally comprises initially dropping the high pressure of the stream from said polymerization zone to a pressure within the range of about 2,000 psi to about 5,000 psi, followed by further lowering of the pressure to a value within the indicated range, separating a major proportion of ethylene from the stream upon the initial reduction of pressure, and recycling the separated ethylene to the polymerization zone.

7. The method of claim 1 wherein the resulting foamed polyethylene extrudate is cooled by contact with a water cooling medium.

* * * * *